United States Patent
Maini et al.

(10) Patent No.: US 9,819,547 B2
(45) Date of Patent: Nov. 14, 2017

(54) SERVER PROVISIONING BASED ON JOB HISTORY ANALYSIS

(71) Applicant: BMC Software, Inc., Houston, TX (US)

(72) Inventors: Nitin Maini, Pune (IN); Neeran Karnik, Pune (IN)

(73) Assignee: BMC Software, Inc., Houston, TX (US)

( * ) Notice: Subject to any disclaimer, the term of this patent is extended or adjusted under 35 U.S.C. 154(b) by 528 days.

(21) Appl. No.: 14/145,216

(22) Filed: Dec. 31, 2013

(65) Prior Publication Data

US 2015/0188768 A1 Jul. 2, 2015

(51) Int. Cl.
*G06F 9/50* (2006.01)
*H04L 12/24* (2006.01)
*H04L 12/26* (2006.01)
*H04L 12/891* (2013.01)
*G06F 9/445* (2006.01)

(52) U.S. Cl.
CPC ............ *H04L 41/0883* (2013.01); *G06F 8/61* (2013.01); *H04L 43/045* (2013.01); *H04L 47/41* (2013.01); *G06F 8/65* (2013.01)

(58) Field of Classification Search
CPC ............ G06F 9/45558; G06F 9/45533; G06F 11/0712; G06F 21/51; G06F 2009/4557; G06F 8/60; G06F 9/5072; G06F 2209/508; G06F 8/61; G06F 8/65; G06F 9/5011; G06F 11/1464; G06F 17/30958; G06F 11/1484; G06F 11/203; G06F 3/065; G06F 11/1469; G06F 11/1448; G06F 2201/835; G06F 21/6218; G06F 2009/45562; G06F 11/1456; G06F 11/3495; G06F 17/27; G06F 3/0629; H04L 43/045; H04L 47/41; H04L 41/0806; H04L 41/0883; H04L 67/34; G06Q 10/06; G06Q 10/06316; G06Q 10/06311
See application file for complete search history.

(56) References Cited

U.S. PATENT DOCUMENTS

| | | | |
|---|---|---|---|
| 8,533,608 B1 * | 9/2013 | Tantiprasut ............ | G06Q 10/06 715/751 |
| 8,756,301 B2 * | 6/2014 | Ennis ..................... | G06N 5/02 709/223 |
| 9,052,961 B2 * | 6/2015 | Mangtani .............. | G06F 9/5072 |

(Continued)

OTHER PUBLICATIONS

"Runbook", Wikipedia, the free encyclopedia, XP055179992, Retrieved from the Internet: URL:http://en.wikipedia.org/w/index.php?title=Runbook&oldid=568474301 [retrieved on Mar. 30, 2015], Aug. 14, 2013, 1-3 pages.

(Continued)

*Primary Examiner* — Kevin Bates
*Assistant Examiner* — Ranjan Pant
(74) *Attorney, Agent, or Firm* — Brake Hughes Bellermann LLP

(57) ABSTRACT

A system includes a runbook manager configured to generate a runbook governing future server provisioning jobs, based on analyzed job history. The runbook manager includes a history analyzer configured to analyze a job history for a plurality of provisioning jobs performed to provision a plurality of servers, to thereby obtain the analyzed job history.

14 Claims, 9 Drawing Sheets

(56) References Cited

U.S. PATENT DOCUMENTS

| | | | | |
|---|---|---|---|---|
| 2006/0136490 A1* | 6/2006 | Aggarwal | ............. | G06Q 10/06 |
| 2007/0250608 A1* | 10/2007 | Watt | ..................... | G06F 9/4401 |
| | | | | 709/222 |
| 2009/0172537 A1* | 7/2009 | Cheng | ................... | G06F 3/0481 |
| | | | | 715/704 |
| 2012/0096457 A1* | 4/2012 | Gupta | ................ | G06F 9/45558 |
| | | | | 718/1 |
| 2012/0185913 A1* | 7/2012 | Martinez | ................ | G06F 9/455 |
| | | | | 726/1 |
| 2012/0317259 A1* | 12/2012 | Shikano | ............. | H04L 12/6418 |
| | | | | 709/223 |
| 2013/0232498 A1* | 9/2013 | Mangtani | ............. | G06F 9/5072 |
| | | | | 718/104 |
| 2014/0082621 A1* | 3/2014 | Fitzgerald | .......... | G06F 9/45533 |
| | | | | 718/1 |

OTHER PUBLICATIONS

EP14200571.9 , "Extended European Search Report Received", dated Apr. 9, 2015, 9 pages.

Grieser, Tim, "Workload Automation: Optimizing Business Processes in Today's Real-Time Enterprises", IDC, White Paper, Mar. 2012, 12 pages.

Pitrof, Walter et al., "Runbook Automation mit System Center Orchestrator", Microsoft, 2011, 31 pages.

"Run Book Automation: Job Scheduling for IT Operations", Opalis, White Paper, Jul. 20, 2007, 5 pages.

\* cited by examiner

Sample Data that is pulled from the Query

| Architecture | os | server | start_time | Parent_job_type | file_info | |
|---|---|---|---|---|---|---|
| x86 | Windows2003 | immotvir04 | 29:03.9 | Prevision Job | NULL | Null |
| x86 | Windows2003 | immotvir04 | 59:04.1 | Deploy Job | NULL | blpackages/Reboot-job |
| x86 | Windows2003 | immotvir04 | 00:09.5 | Deploy Job | NULL | blpackages/sysprep-27485.1 |
| x86 | Windows2003 | immotvir04 | 08:36.2 | Deploy Job | NULL | blpackages/RDP---2k3-enable-27498.1 |
| x86 | Windows2003 | immotvir04 | 09:07.7 | Deploy Job | NULL | blpackages/Teleph6ony-Service--Disable-27513.1 |
| x86 | Windows2003 | immotvir04 | 09:45.2 | Deploy Job | NULL | blpackages/Windows-update-Service---Disable |
| x86 | Windows2003 | immotvir04 | 10:26.6 | Deploy Job | NULL | blpackages/ServerBuildAutoScript-27566.1 |
| x86 | Windows2003 | immotvir04 | 11:00.9 | Deploy Job | NULL | blpackages/edmz-addnds-4347.1 |
| x86 | Windows2003 | immotvir04 | 11:55.6 | Deploy Job | NULL | blpackages/Portion-2k3-29936.1 |
| x86 | Windows2003 | immotvir04 | 13:03.5 | Deploy Job | NULL | blpackages/SNMP-34423.1 |
| x86_64 | Windows2008 | vm-blg-dev45 | 15:47.4 | Provision Job | NULL | NULL |
| x86_64 | Windows2008 | vm-blg-dev45 | 16:07.9 | Deploy Job | NULL | blpackages/IPMAN-77685.1 |
| x86_64 | Windows2008 | vm-blg-dev45 | 16:48:4 | NSH Script Job | NULL | scripts/39122.1_drive.text |
| x86_64 | Windows2008 | vm-blg-dev45 | 17:07.8 | Deploy Job | NULL | blpackages/Citrix-Admin-43833.1 |
| x86_64 | Windows2008 | vm-blg-dev45 | 17:35.6 | NSH Script Job | NULL | scripts/39122.1_drive.text |
| x86_64 | Windows2008 | vm-blg-dev45 | 17:55.4 | File Script Job | NULL | //entcode1/E/DUKELOAD/NTServer/CitrixPatches |
| x86_64 | Windows2008 | vm-blg-dev45 | 21:32.5 | Provision Job | NULL | Scripts/39122.1_drive.text |
| sparc | Soraris11 | dev-java-sol39 | 21:52.4 | Deploy Job | NULL | NULL |
| sparc | Soraris11 | dev-java-sol39 | 22:38.5 | Deploy Job | NULL | blpackages/Marimba-29549.1 |
| sparc | Soraris11 | dev-java-sol39 | 30:23.8 | Deploy Job | NULL | blpackages/McAfee-Virus-Scan-Enterprise-8.7i- |
| sparc | Soraris11 | dev-java-sol39 | 05:48.6 | Deploy Job | NULL | blpackages/EPO-Agent-39565.1 |
| sparc | Soraris11 | dev-java-sol39 | 07:59.7 | NSH Script Job | NULL | scripts/38122.1_drive.text |
| sparc | Soraris11 | dev-java-sol39 | 08:26.6 | Deploy Job | NULL | blpackages/Move-OU---Detox-43646.1 |
| sparc | Soraris11 | dev-java-sol39 | 09:03.8 | NSH Script Job | NULL | script/39122.1_drive.text |

SERVER PROVISIONING BASED ON JOB HISTORY ANALYSIS

TECHNICAL FIELD

This description relates to server provisioning and configuration management.

BACKGROUND

Data centers typically deploy a large number of servers. Customers of the data center may contract with the data center for access to, and use of, the deployed servers. The various customers, and even a single customer, may have widely-varying needs with respect to the deployed servers. Therefore, the data center may deploy multiple types of servers, each specifically configured to meet the needs of a corresponding customer.

When a new server is deployed within the data center, the new server must go through a series of provisioning and configuration steps. For example, a new, basic server may first be provided with a desired operating system (OS). Subsequently, a desired set of software applications may be installed, corresponding to predetermined needs of a corresponding customer. Security policies may then be implemented with respect to the server. As a final example, it may be necessary to schedule future tasks to be implemented by the server (e.g., compliance checks or automated data backup procedures).

These and varying other provisioning activities must generally be performed separately, in a correct sequence, and by various types of users, who must thus communicate with one another in order to correctly execute the provisioning of the server in question. It is difficult for the users to execute their assigned tasks correctly, to coordinate with one another effectively, and to be aware of current best practices with respect to their assigned tasks. Consequently, data centers may suffer from unreliable, time-consuming, and generally inefficient provisioning of servers, which may lead to reduced profits and/or increased customer dissatisfaction.

SUMMARY

According to one general aspect, a system includes instructions stored on a non-transitory computer readable storage medium and executable by at least one semiconductor processor. The system includes a runbook manager configured to cause the at least one semiconductor processor to generate a runbook governing future server provisioning jobs, based on analyzed job history. The runbook manager includes a history analyzer configured to analyze a job history for a plurality of provisioning jobs performed to provision a plurality of servers, to thereby obtain the analyzed job history.

According to another general aspect, a method includes analyzing a job history for a plurality of provisioning jobs performed to provision a plurality of servers, to thereby obtain the analyzed job history, and generating a runbook governing future server provisioning jobs, based on analyzed job history.

According to another general aspect, a computer program product includes instructions recorded on a non-transitory computer readable storage medium and configured to cause at least one processor to analyze a job history for a plurality of provisioning jobs performed to provision a plurality of servers, to thereby obtain the analyzed job history, and generate a runbook governing future server provisioning jobs, based on analyzed job history.

The details of one or more implementations are set forth in the accompanying drawings and the description below. Other features will be apparent from the description and drawings, and from the claims.

BRIEF DESCRIPTION OF THE DRAWINGS

FIG. 8 is a table listing sample data used to create a runbook graph illustrated in FIG. 9.

DETAILED DESCRIPTION

Figure 1:
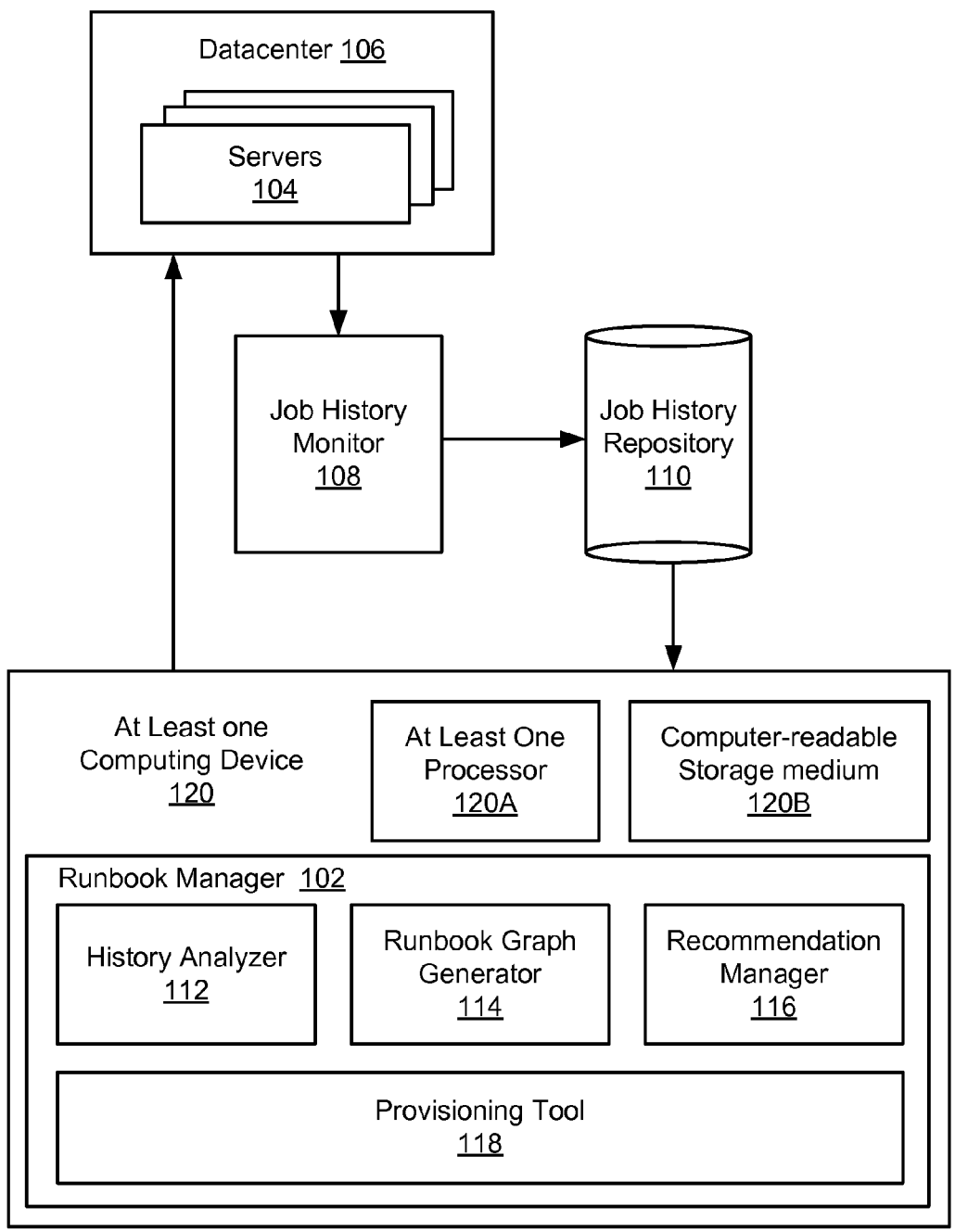
FIG. 1 is a system for server provisioning based on job history analysis.

FIG. 1 is a block diagram of a system 100 for server provisioning based on job history analysis. In the example of FIG. 1, a runbook manager 102 may be configured to provision and update a plurality of servers 104 within a data center 106. More specifically, as illustrated and described herein, the runbook manager 102 may utilize a job history monitor 108 configured to store job histories related to previous server provisioning operations within the data center 106, using a job history repository 110. In this way, the runbook manager 102 may generate a runbook which effectively governs future provisioning operations with respect to new servers added to the existing servers 104, and also enables effective updating of existing servers within the data center 106.

Thus, instead of requiring expert users associated with the data center 106 to spend time and effort in capturing their knowledge in static runbook documents, and in keeping such runbook documents updated, the runbook manager 102 effectively learns runbooks through its examination of the job history repository 110. That is, the runbook manager 102 learns runbooks through examination of a history of server provisioning and configuration jobs. The runbook manager 102 may thus also automatically update runbooks by periodically relearning them, using fresh, current job history from within the job history repository 110.

Further, the runbook manager 102 may be configured to automatically suggest one or more appropriate runbooks (or portions thereof) in conjunction with a desired server provisioning, thereby minimizing or eliminating a need for a user at the data center 106 to correctly select an appropriate runbook to use in provisioning a particular server. Instead, the runbook manager 102 allows such a user to interactively specify provisioning operations for such a server, using previously-learned runbooks.

Moreover, the runbook manager 102 minimizes or eliminates a need for a plurality of users of the data center 106 to coordinate with one another and to generally ensure that a correct and desired sequence of provisioning operations are performed. That is, instead of relying on the user(s) of the data center 106 to correctly follow documented steps within each static runbook in a correct sequence, the runbook manager 102 may be configured to effectively automate an execution of provisioning operations with respect to a new server to be deployed within the data center 106.

In the example of FIG. 1, it is assumed that the job history monitor 108 represents, or leverages, a server automation tool that is configured to collect metadata representing the types of jobs executed against a server and characteristics (e.g., content and timing) of such jobs. In other words, in the example, the job history monitor 108 may represent a general purpose tool designed, potentially among other designed functions, to collect many various types of job history parameters with respect to operations of the servers 104.

Therefore, in such examples, as described in detail below, the runbook manager 102 may be configured to select data from the job history repository 110, from among all the data stored therein, which is identified as being useful in performing the various functions of the runbook manager 102 described herein. However, it may be appreciated that, in other example implementations, the job history monitor 108 may be a special purpose tool designed to collect provisioning information related to the servers 104 that is directly leveraged by the runbook manager 102 in performing the various features and functions of the runbook manager 102 described herein.

In the example of FIG. 1, the runbook manager 102 includes a history analyzer 112 which may be configured to leverage the job history data from the job history repository 110. Specifically, as described in more detail below, the history analyzer 112 may utilize a chronological timeline of tasks executed with respect to specific servers of the servers 104. For example, where the job history monitor 108 represents a server automation tool, then the job history repository 110 may effectively provide a timeline of tasks executed against the servers 104 and recorded by the job history monitor 108. Thus, the history analyzer 112 may learn typical and/or frequently-executed sequences of tasks executed with respect to each server, and may group or otherwise classify such tasks with respect to types of servers deployed within the data center 106.

In other words, for example, if the history analyzer 112 considers that three of the servers 104 belong to a certain class or type of server, then any timeline of tasks stored within the job history repository 110 and as having been executed with respect to any of those three servers will be considered to have been executed with respect to the single type of server existing within the classification scheme of the history analyzer 112. Moreover, each task utilized by the history analyzer 112 may be considered or otherwise determined to advance the relevant server type from a first state to a second state. For example, a task of installation of an operating system may be considered to advance a server from a state of not having an operating system to a state of having an operating system. The history analyzer 112 thus learns which provisioning tasks are performed with respect to each server type, as well as how often each provisioning task occurs.

Then, based on information from the history analyzer 112, a runbook graph generator 114 may be configured to provide a runbook graph, such as illustrated and described below with respect to FIGS. 3 and 9, in which the job history data provided by the history analyzer 112 is represented as a forest graph, in which each tree graph of the forest graph represents a distinct type of server. That is, each such server type represents a root node of a tree graph of the overall forest graph provided by the runbook graph generator 114. Then, starting from each such root, the generated runbook graph captures the various provisioning paths (and associated path frequencies) that previously occurred during past server provisioning operations. Thus, as just referenced with respect to the history analyzer 112, each node in the runbook graph represents a server state, while each link between two nodes represents a task or job that moves the corresponding server between the two linked states.

As also described in detail below, such a learning process executed by the history analyzer 112 and the runbook graph generator 114 may be configured to execute periodically, so that subsequent changes of the server states also may be captured. Thus, users of the data center 106 may execute ad-hoc provisioning or configuration tasks based on very current job history from within the job history repository 110, because the runbook graph generator 114 effectively enriches a corresponding runbook graph for corresponding server types using newly-added or modified server states and/or provisioning operations.

In some implementations, the runbook graph thus, generated by the runbook graph generator 114 may be provided to a user of the data center 106. In such cases, the user may be allowed to annotate nodes of the runbook graph using preferred labels to describe corresponding server states and/or provisioning operations. This and related features thus assist in making the runbook graph more human-readable and usable.

Using the runbook graph provided by the runbook graph generator 114, a recommendation manager 116 may be configured to assist a user in provisioning a new server within the data center 106, as well as with updating an existing one of the servers 104. For example, as described in detail below, when a new server is to be provisioned and deployed within the data center 106, the recommendation manager 116 may identify, based on a type of the server to be provisioned, a matching root node within the forest graph of the runbook graph provided by the runbook graph generator 114.

Once the root node is identified, the recommendation manager 116 may auto-suggest a sequence of tasks to be applied to the server to be provisioned, e.g., may identify the tree graph starting with the identified root. Thus, for example, the user may graphically traverse the identified tree of possible tasks, and may indicate a desired final state. For example, the user may identify such a desired final state through the use of searching for such a state, using labels or other metadata previously specified with each node during previous operations of the runbook graph generator 114. In other examples, a graphical user interface (GUI) representing an appropriate tree graph or portion thereof may provide interactive elements so that a user may easily select a desired server state using just a point-and-click operation.

Somewhat similarly, in an example in which an existing one of the servers 104 is to be updated, a current job history of the server in question may be considered, in order to identify a most-similar path within a corresponding tree graph of the runbook graph provided by the runbook graph generator 114. Thereafter, the user may be prompted with a remainder of the identified tree. As referenced above, and as described in detail below, the user may be assisted in selecting a desired state for the server in question through the use of identification of a frequency, popularity, or other characteristic of individual links and/or entire paths from within relevant tree graphs of the overall runbook graph.

Once the recommendation manager 116 has provided or assisted the user at the data center 106 with a desired path (e.g., sequence of provisioning operations and associated state changes), a provisioning tool 118 may be configured to auto-create and/or schedule the identified provisioning jobs associated with taking the server from its current state to its desired final state. For example, in the example of FIG. 1, as referenced above, the job history monitor 108 may represent, or be associated with, a server automation tool. In such cases, the provisioning tool 118 may interact with the server automation tool to schedule the tasks identified by the recommendation manager 116. In some implementations, such a server automation tool may include, or provide, both the job history monitor 108 and the provisioning tool 118.

In example implementations, as described in more detail below, the runbook graph provided by the runbook graph generator 114 may store individual provisioning operations (e.g., jobs, tasks) in templatized forms, optionally, along with default parameters. In this way, the user may be given the opportunity to modify/parameterize each provisioning operation within the identified sequence of provisioning operations provided by the recommendation manager 116. In the example, at this point, the entire sequence of jobs may be automatically scheduled and/or executed.

Thus, as described the runbook manager 102 may be configured to auto-create runbooks, with little or no need for human input, while also improving the resulting runbooks over time, as best practices evolve. Further, the potential for partial or complete auto-execution of these runbooks also minimizes or eliminates human error in the server provisioning process, as well as eliminating a need for hand offs between different types of users within the data center 106. Consequently, the reliability and turnaround time for server provisioning may be improved.

Moreover, because the runbook manager 102 may be configured to periodically reanalyze job history from within the job history repository 110, the runbook graph provided by the runbook graph generator 114 may incrementally improve and evolve over time. For example, frequencies of relatively popular sequences of provisioning operations (i.e., frequent paths through individual trees of the runbook graph) may be represented as increasing over time, thereby making it more likely that best practices will be followed during subsequent provisioning operations.

In the present description, the term provisioning is used to refer to any activities, or related activities, associated with preparing a server to be deployed or otherwise prepared for use. As referenced, such provisioning may include associated configuration operations, as well as re-provisioning operations that occur when an already-deployed server is updated.

In the example of FIG. 1, the runbook manager 102 as illustrated as being executed using at least one computing device 120, which itself is illustrated as including at least one processor 120A, as well as a computer-readable storage medium 120B. Of course, the at least one computing device 120 is intended to represent the conversion of a general purpose computing device into a special purpose computing device implementing the runbook manager 102. Consequently, it will be appreciated that many features and functions of the at least one computing device 120, which, by themselves, would be well understood to one of skill in the art, are not described in detail herein. Instead, the at least one computing device 120 is illustrated as including at least one hardware, semiconductor processor 120A, which may be configured to execute instructions stored within the non-transitory computer-readable storage medium 120B. Of course, in this context, it would be appreciated that the at least one computing device 120 may represent two or more computers in communication with one another, e.g., over a network. Somewhat similarly, the at least one processor 120A may represent two or more processors executing in parallel, while the computer-readable storage medium 120B may represent two or more non-transitory storage media.

In the example of FIG. 1, the job history monitor 108 is illustrated as executing separately from the at least one computing device 120. However, it may be appreciated that such illustration is merely for the sake of clarity and convenience in illustrating and describing the various features and functions of the system 100. In various implementations, the at least one computing device 120 may be configured to execute the job history monitor 108 and/or the job history repository 110, or portions thereof. Further, the provisioning tool 118 is illustrated within the runbook manager 102; however, in some implementations, some or all of the provisioning tool may be executed externally to the runbook manager 102, e.g., as part of a server automation tool that also includes the job history monitor 108. Moreover, it may be appreciated that any or all of the components 108-120 may be executed at the data center 106, e.g., using one of the servers 104.

In the example of FIG. 1, as just referenced, various individual components are illustrated separately for the sake of clarity and convenience in explaining example operations of the system 100. However, it may be appreciated that, in other implementations, any two or more of the various components may be implemented as a single component. Conversely, it may be appreciated that any individual component of the system 100 may be implemented using two or more sub-components.

Figure 2:
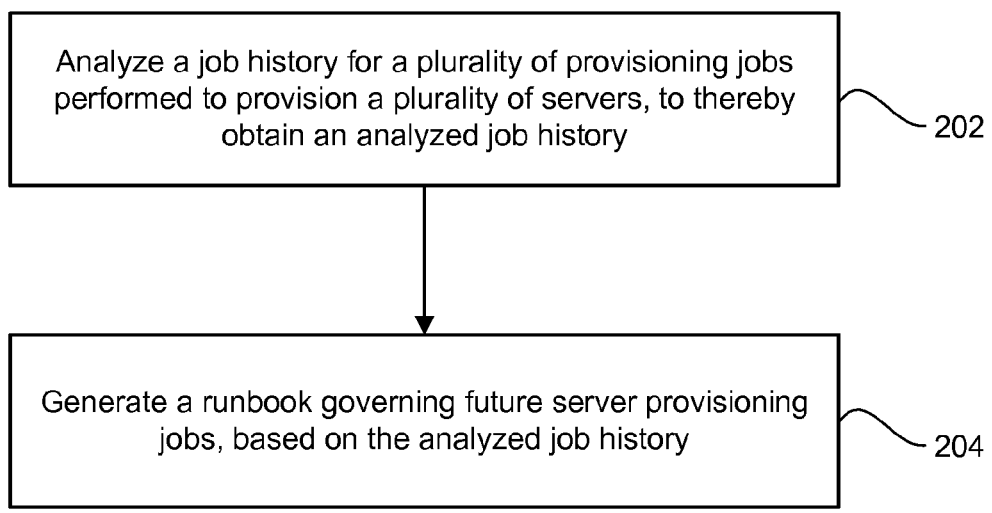
FIG. 2 is a flowchart illustrating example operations of the system of FIG. 1.

FIG. 2 is a flowchart 200 illustrating example operations of the system 100 of FIG. 1. In the example of FIG. 2, operations 202, 204 are illustrated as sequential, separate operations. However, it may be appreciated that, in other implementations, the flowchart 200 may include various additional or alternative operations, and that such operations may be executed in a partially or completely parallel or overlapping manner, and/or in a branched, looped, iterative, or nested fashion.

In the example of FIG. 2, a job history for a plurality of provisioning jobs performed to provision a plurality of servers may be analyzed, to thereby obtain an analyzed job history (202). For example, the history analyzer 112 of the runbook manager 102 of FIG. 1 may be configured to analyze the job history from within the job history repository 110. As described, the history analyzer 112 may thus provide an analyzed job history that includes all information required by the runbook graph generator 114 to generate the type of forest runbook graph referenced above and illustrated and described in more detail below, e.g., with respect to FIGS. 3 and 9.

Then, a runbook may be generated which governs future server provisioning jobs, based on the analyzed job history (204). For example, the runbook manager 102 may generate such a runbook. In the example of FIG. 1, such a runbook is described as the type of forest runbook graph just referenced with respect to operation 202 as being illustrated and described in detail below with respect to FIGS. 3 and 9. In such examples, it may be appreciated that, in effect, a plurality of runbooks are included within the overall forest graph of such runbook graphs, so that, as described, each tree graph of the forest graph represents one or more potential runbooks for a server having a server type corresponding to a root node of the tree graph in question.

As referenced above with respect to FIG. 1 (e.g., with respect to the recommendation manager 116 and the provisioning tool 118), such a runbook graph may be utilized to auto-suggest and parameterize a specific set of provisioning jobs to be executed with respect to a new or existing server. Moreover, once identified and parameterized, a sequence of provisioning jobs identified using the underlying runbook graph may be automatically executed with respect to the server in question.

Figure 3:
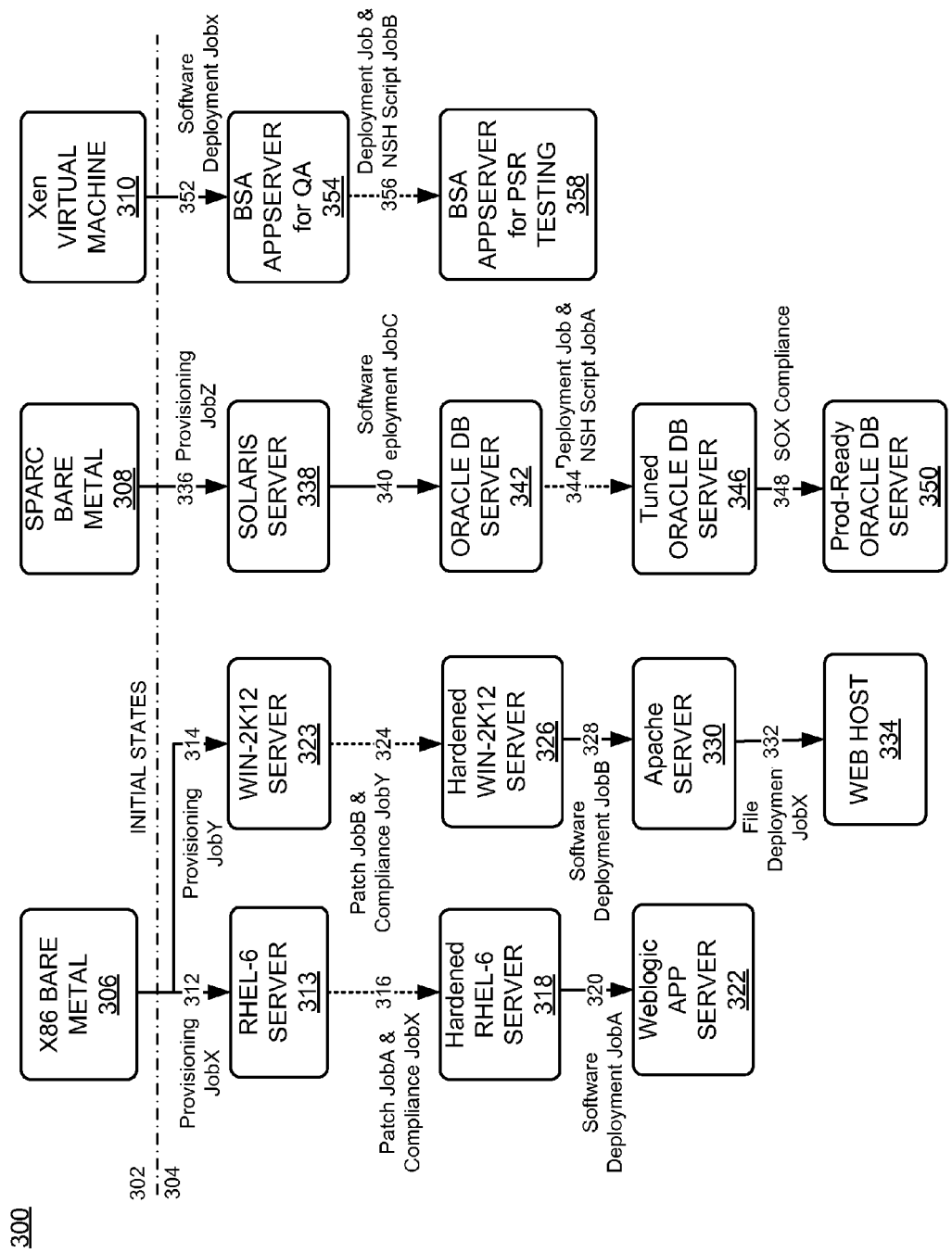
FIG. 3 is a block diagram of a runbook graph provided by the system of FIG. 1.

FIG. 3 is a block diagram of a runbook graph 300 generated using the runbook graph generator 114 of FIG. 1. In the example of FIG. 3, it may appreciated that the various illustrated server states and provisioning jobs are intended merely as high-level representations of otherwise-well known provisioning jobs and server states. Consequently, individual server states and/or provisioning jobs are not described herein in detail, and would be apparent to one of skill in the art. Rather, as may be appreciated, the example of FIG. 3 is intended to provide an abbreviated, simplified illustration of the types of runbook graphs that may be generated with respect to data centers such as the data center 106. Further, although the example of FIG. 3 is illustrated as a forest graph of links and nodes, it may be appreciated that, in other implementations, the runbook of the present description may be displayed or represented in other suitable forms.

In the example of FIG. 3, as referenced above, the runbook graph 300 may be considered to include initial states 302, and all subsequent provisioning states 304. That is, as shown, the initial states 302 include state nodes 306, 308, 310, which correspond to initial, un-provisioned servers, each having a specific type defined by the history analyzer 112. For example, the node 306 represents an initial, un-provisioned state of the type of server having the x86 architecture, and is labeled "bare metal," to indicate its status as an initial, completely un-provisioned state.

Similarly, the node 308 identifies a Sparc server type, which is also a hardware server designated as bare metal. Meanwhile, the node 310 illustrates an un-provisioned virtual server, designated as server type XEN, and labeled as a virtual machine to indicate that servers of this type are deployed as software-based servers which are virtualized within the context of underlying hardware architecture.

As described with respect to FIG. 1, the history analyzer 112 may analyze the job history within the job history repository 110 with respect to servers of the server types referenced by the nodes 306, 308, 310. In so doing, as illustrated, the history analyzer 112 may identify a provisioning job X (i.e., at least one instance in which the provisioning job X is executed with respect to a server of the type referenced in the node 306), which is represented by a link 312 between the node 306 and a subsequent state node 313.

As described above, although not specifically or explicitly illustrated with respect to FIG. 3, the history analyzer 112 determines a frequency with which the provisioning job X has been executed with respect to various servers of the type represented by the node 306. Then, the runbook graph generator 114 may represent or illustrate such frequency information with respect to the illustrated link 312 (or the state node 313). For example, a frequency count may be illustrated in proximity to the link 312 within a graphical user interface (GUI). In other implementations, a relative frequency may be illustrated by darkening or thickening the link 312 relative to other links.

Similarly, a link 314 illustrating executions of a provisioning job Y demonstrates a state change of at least one instance of a server of the server type represented by the node 306 to a subsequent state represented by a state node 323. In the example of FIG. 3, the nodes 313, 323 illustrate installation of different types of otherwise-well known operating systems (i.e., Red Hat Enterprise Linux (RHEL)-6, and Win-2K12, respectively). Of course, any appropriate operating system could be installed with respect to the corresponding server type of a preceding root node, and it may occur that more than two such operating systems may be installed within such context (i.e., it may occur that the root node 306 has a greater number of links than illustrated in the simplified example of FIG. 3). Nonetheless, FIG. 3 illustrates that job histories in which multiple operating systems are installed with respect to various instances of a given server type within the data center 106 may be easily and consistently illustrated within the context of the runbook graph 300.

Continuing the example of FIG. 3, a patch job A and compliance job X are represented by a dashed link 316, which converts the state represented by the node 313 to a new state, represented by a node 318. Specifically, as shown, the node 318 represents a state in which servers are the server type in question have been "hardened" from a network security standpoint. Similarly, as shown, a dashed link 324 represents a conversion of the node 323, by way of patch job B and compliance job Y, to a state corresponding to a hardened WIN-2K12 server, as represented by state node 326.

In the just-described examples, the dashed lines associated with the links 316, 324 are intended to illustrate that a plurality of operations occurred between the state represented by the nodes 313, 323 and the subsequent states represented by ensuing nodes 318, 326. However, for purposes of the runbook graph 300, it may occur that it is preferable to group such sequences of provisioning jobs, to thereby reflect meaningful state changes that occur in the context of provisioning servers of the type in question.

In other words, not every individual provisioning job or associated job that is executed may be worth representing using corresponding individual links and state nodes. Rather, it may be more efficient to collapse such collections of provisioning jobs into a single link. For example, it may occur that certain groups of provisioning jobs always are required to occur together, in which case it would not be helpful to represent them individually. In any case, it may be appreciated that such groupings are optional and customizable, and may be defined or modified by the user of the runbook graph 300.

Continuing the example of FIG. 3, links 320 and 328 refer respectively to software deployment job A and software deployment job B. As illustrated, the software deployment job A represented by the link 320 converts the hardened RHEL-6 server of the node 318 to a state represented by the node 322 in which a Weblogic app server is created. Analogously, the software deployment job B represented by the link 328 converts the hardened WIN-2K12 server of the node 326 to an Apache server represented by a state node 330. Further, a link 332 represents a file deployment job X which converts the Apache server of the state node 330 to a web host represented by a state node 334.

Thus, the tree graph beginning with the node 306 represents one tree graph of the overall forest graph of the runbook graph 300, in which servers of a server type corresponding to the node 306 have been provisioned over time within the context of the servers 104 of the data center 106. Thus, it may be appreciated that the root node 308 similarly initiates a second tree graph, which analogously illustrates a provisioning history of servers of the server type identified by the root node 308.

Therefore, as shown, a link 336 represents a provisioning job Z converting the bare metal Sparc server of the root node 308 into a Solaris server represented by node 338. A software deployment job C is represented by a link 340 as converting the Solaris server of the state node 338 to an Oracle database server of a state node 342. A link 344 represents a deployment job and NSH script job A which converts the Oracle database server 342 into a tuned Oracle database server and represented by a state node 336. Finally with respect to the tree graph of the root node 308, a link 348 illustrates provisioning jobs related to SOX compliance, which converts to the tuned Oracle database server of the node 346 into a production-ready Oracle database server 350.

Continuing further in FIG. 3, the root node 310 of a third tree graph of the runbook graph 300 is illustrated as being converted by way of a software deployment job X, represented by a link 352, into a BMC Server Automation (BSA) app server for quality assurance (QA), as represented by node 354. Then, provisioning jobs identified as deployed job and NSH script job B are represented by dashed link 356, which converts the BSA app server for QA of the node 354 into a BSA app server for performance, scalability, and reliability (PSR) testing, represented by a state node 358.

Although a single instance of the runbook graph 300 is illustrated in FIG. 3, it may be appreciated that the runbook graph is not required to be a static object. Rather, as described herein, the runbook graph may be re-generated or otherwise updated, e.g., either periodically or upon detection/notification that a certain type or amount of new job history has become available. In this case, the runbook graph may evolve over time, without requiring human involvement to do so.

Figure 4:
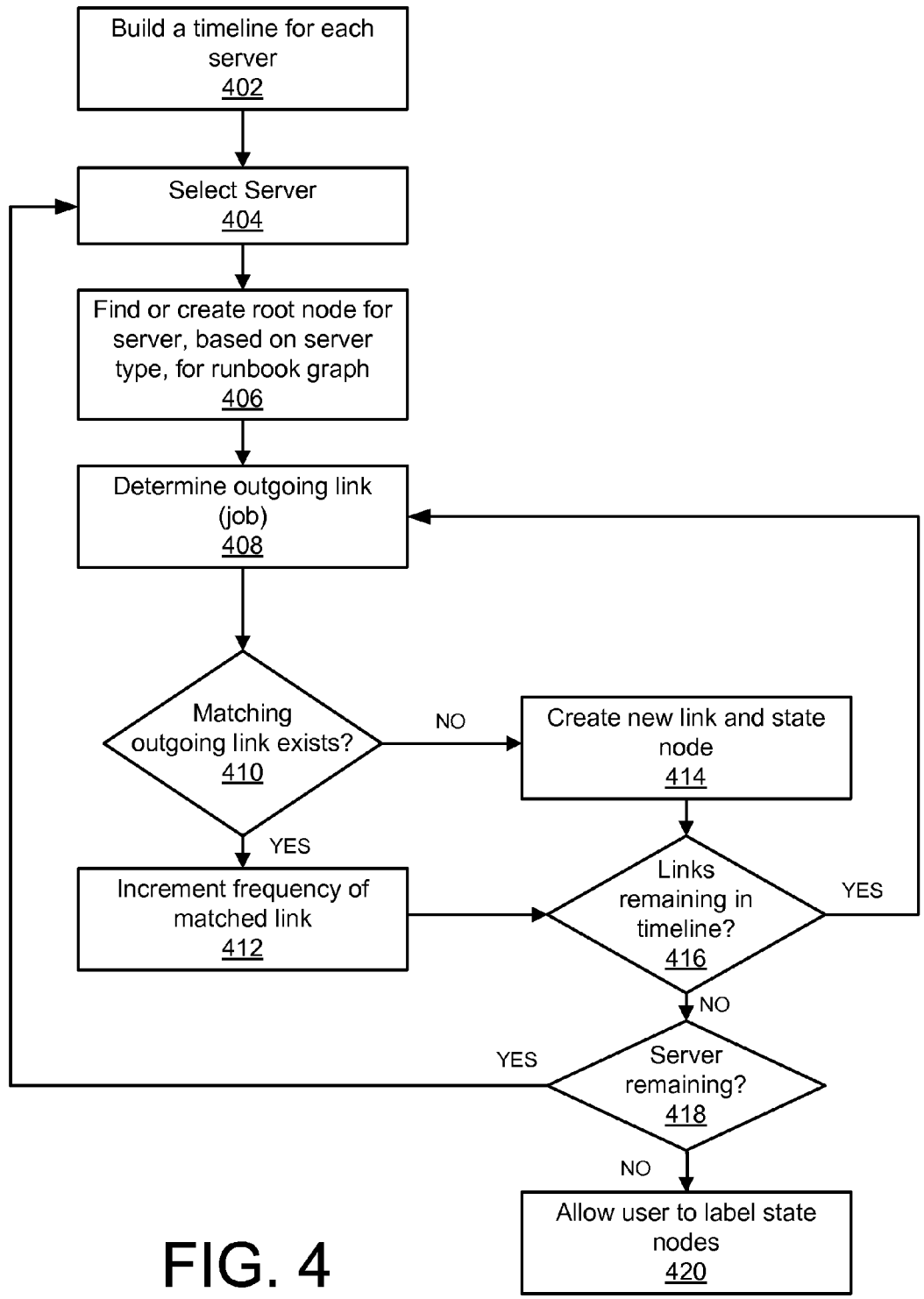
FIG. 4 is a flowchart illustrating associated operations for generating the runbook graph of FIG. 3.

FIG. 4 is a flowchart 400 illustrating more detailed example operations with respect to a creation of the runbook graph 300 of FIG. 3. For purposes of explaining the example of FIG. 4, and consistently with FIG. 3, it is assumed that the history analyzer 112 of FIG. 1 is configured to provide the runbook generator 114 of FIG. 1 with at least the following types and characteristics of provisioning jobs obtained from the job history repository 110.

For example, the history analyzer 112 may identify a type of the provisioning job performed, such as, for example, a software deployment job, an OS provisioning job, or a compliance job, as referenced above and illustrated with respect to FIG. 3. The history analyzer 112 may identify a specific job that was run, such as by providing a unique identifier of a specific deployed job that installed any software package such as Microsoft Office. The history analyzer 112 also may provide content used by the job in question, such as an MS Office software package, or a SOX compliance policy. Further, the history analyzer 112 may provide a time of the job execution of the provisioning job in question, as well as one or more targets of the provisioning job (i.e., the servers against which the provisioning job was run). Still further, the history analyzer 112 may provide a status or other characteristic of each provisioning job, such as whether the provisioning job succeeded, failed, or was cancelled.

Further, it may be appreciated that configuration information about each server may be separately stored and available. From such configuration information, the history analyzer 112 may determine, e.g., a specific processor architecture (e.g., X86 or Sparc), or whether the server in question is a specific type of virtual machine.

In the example of FIG. 4, the runbook graph generator 114 may begin by building a timeline of provision jobs for each server identified by the history analyzer 112 from the provisioning job history repository 110 (402). That is, for example, the runbook graph generator 114 may analyze an appropriate job run log and construct a timeline for each unique server against which jobs are executed, thus representing a chronological sequence of job runs targeting the specific, unique server.

Then, from among all such identified, unique servers, a server may be selected (404), and a corresponding root node for the selected server may be found or created, based on the identified server type of the server in question (406). For example, with respect to the example of FIG. 3, it may occur that, upon initial generation of the runbook graph 300, a first-selected and identified server may be identified as corresponding to a server type having an x86 architecture. For the first such server identified, then, the root node 306 may be created. A subsequently-selected server may thus represent another instance of the existing root node 306, or, in subsequent iterations, may be determined to represent a server of the server type corresponding to the Sparc server of the example of the root node 308, whereupon such a root node may be created.

For a selected server, outgoing links (i.e., provisioning jobs) may be identified (408). In this regard, it may be appreciated that only provisioning jobs having a status of "successful" may be retained, since provisioning jobs which failed or were cancelled may be presumed not to be useful for future provisioning operations (e.g., either did not change the server state, or were rolled back). Somewhat similarly, periodic runs of scheduled jobs (e.g., patch analysis and subsequent remediation jobs) may be removed from consideration as not making state changes of interest with respect to server provisioning.

If an outgoing link exists which matches the determined outgoing link (410), then a frequency of the matched link may be incremented (412). For example, with respect to FIG. 3, in an initial iteration, the runbook graph generator 114 may detect the provisioning job X of the link 312 as the determined outgoing link of operation 408, and may thus create the link 312 connecting the nodes 306, 313. In subsequent iterations, detection of a matching provisioning job in the context of a separate server instance would thus result in incrementing a frequency count associated with the link 312. Thus, it may be appreciated that failure to detect existence of a matching outgoing link (410), would result in creation of a new link with frequency set to one, and subsequent state node (e.g., the state node 313 in the example just provided) (414).

If the timeline being considered continues to contain remaining links/provisioning jobs, then a subsequent outgoing link/job may be selected (408), and processed as just described with respect to operations 410-414. Otherwise, if a unique server is remaining within the job history (418), then the server may be selected (404), and operations 406-416 may be repeated until no servers are remaining (418).

As referenced above, the various nodes of the example in FIG. 3 may be illustrated and labeled in a manner which corresponds to the underlying state of the server in question. However, as also referenced, it may be preferable to allow the user of the runbook graph 300 to label state nodes in a desired manner (420). For example, the user may optionally be prompted to provide a label for each generated node, or leave it blank if preferred. In this way, the state nodes may be customized for convenient use by individual users or groups of users.

Further, as referenced in more detail below, it may occur that each provisioning job stored in conjunction with each corresponding link of the runbook graph 300 may be converted into a generic templatized form. For example, with respect to a specific job executed with respect to a unique server, individual scheduling times, host names, or IP addresses may be removed, and replaced by corresponding categories or fields, resulting in a provisioning job template associated with each corresponding link. Optionally, it may be preferable to store default values for such genericized parameters. In this regard, it may be appreciated that each link represents a potential plurality of provisioning jobs, and that such individual parameters values for the individual provisioning jobs are unlikely to be useful or helpful for future provisioning jobs. Therefore, by representing each provisioning job and associated link in a generic format, it is possible to represent a plurality and frequency of such provisioning jobs in a convenient and useful manner.

Thus, FIGS. 3 and 4 illustrate construction of the runbook graph, such as the runbook graph 300 of FIG. 3, using the runbook graph generator 114 and the history analyzer 112. As also referenced above, e.g., with respect to the recommendation manager 116, the runbook manager 102 may be further configured to utilize the generated runbook graph to assist users in provisioning new servers (or updating existing servers) within the data center 106.

Figure 5:
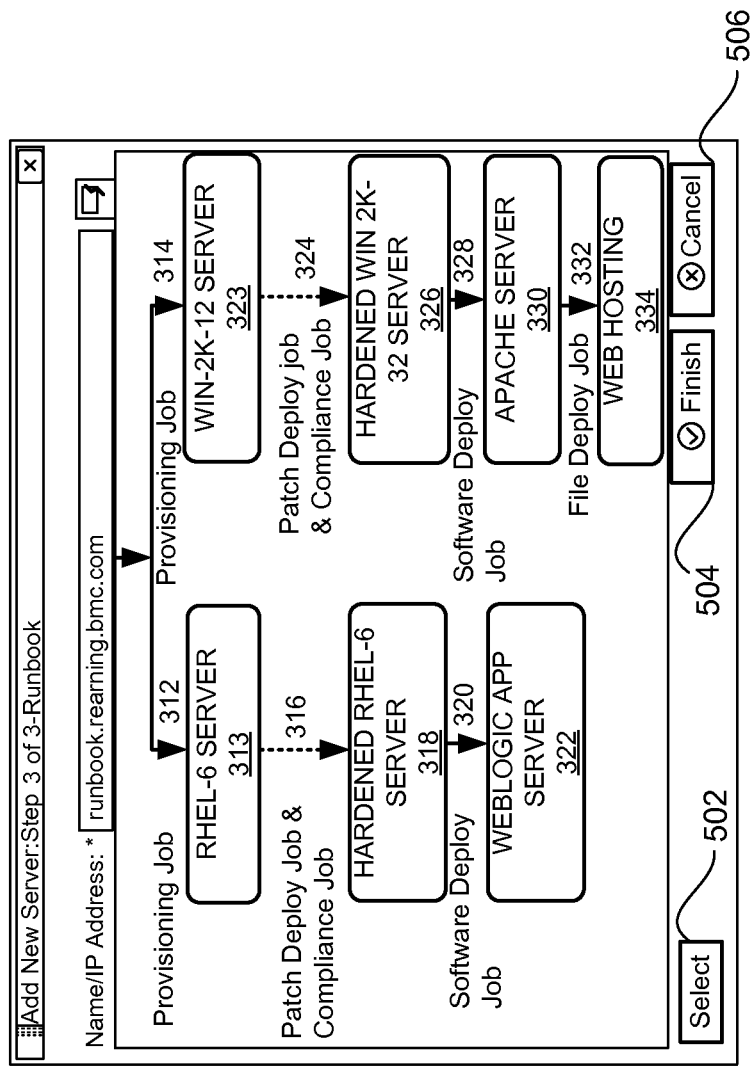
FIG. 5 is a screenshot illustrating an example use of the runbook graph of FIG. 3 in provisioning a new server.

Therefore, FIG. 5 illustrates the screenshot 500 illustrating a user interface provided to the user at the data center 106 to assist the user in selecting an appropriate runbook and associated provisioning jobs when provisioning a new server (or updating an existing server).

As may be appreciated from the example of FIG. 5, the screenshot 500 may be utilized to illustrate an interactive version of the runbook graph 300 of FIG. 3, in which the user of the data center 106 may select individual nodes or links in conjunction with a server being provisioned, in order to determine optimal provisioning operations for that server. For example, as described in more detail below with respect to FIG. 6, the various nodes and links of the runbook graph 300 illustrated in the screenshot 500 may be understood to be selectable by the user of the data center 106, so that the user may, e.g., select a root node corresponding to a type of the server being deployed, as well as selecting a final state desired to be reached with respect to the server in question. As also referenced, other interactive features may be provided with respect to the screenshot 500. For example, the user may be provided with search capabilities to locate specific states or types of states. In other examples, the user interface represented by the screenshot 500 may be configured to provide the user with additional or supplemental information which may assist the user in making selections and other decisions with respect to the runbook graph illustrated therein.

Of course, many different types of well-known graphical user interface (GUI) tools may be implemented in this regard. In the simplified example of FIG. 5, the screenshot 500 is illustrated as including a select button 502, as well as a finish button 504 and a cancel button 506. Further, although not explicitly illustrated in the screenshot 500, it may be appreciated that all of the various links and nodes illustrated therein may be selectable by the user, e.g., perhaps in conjunction with the select button 502. Further, again although not explicitly illustrated, various additional windows or text boxes may be provided to facilitate the types of example operations referenced above, e.g., search functions or help functions.

Figure 6:
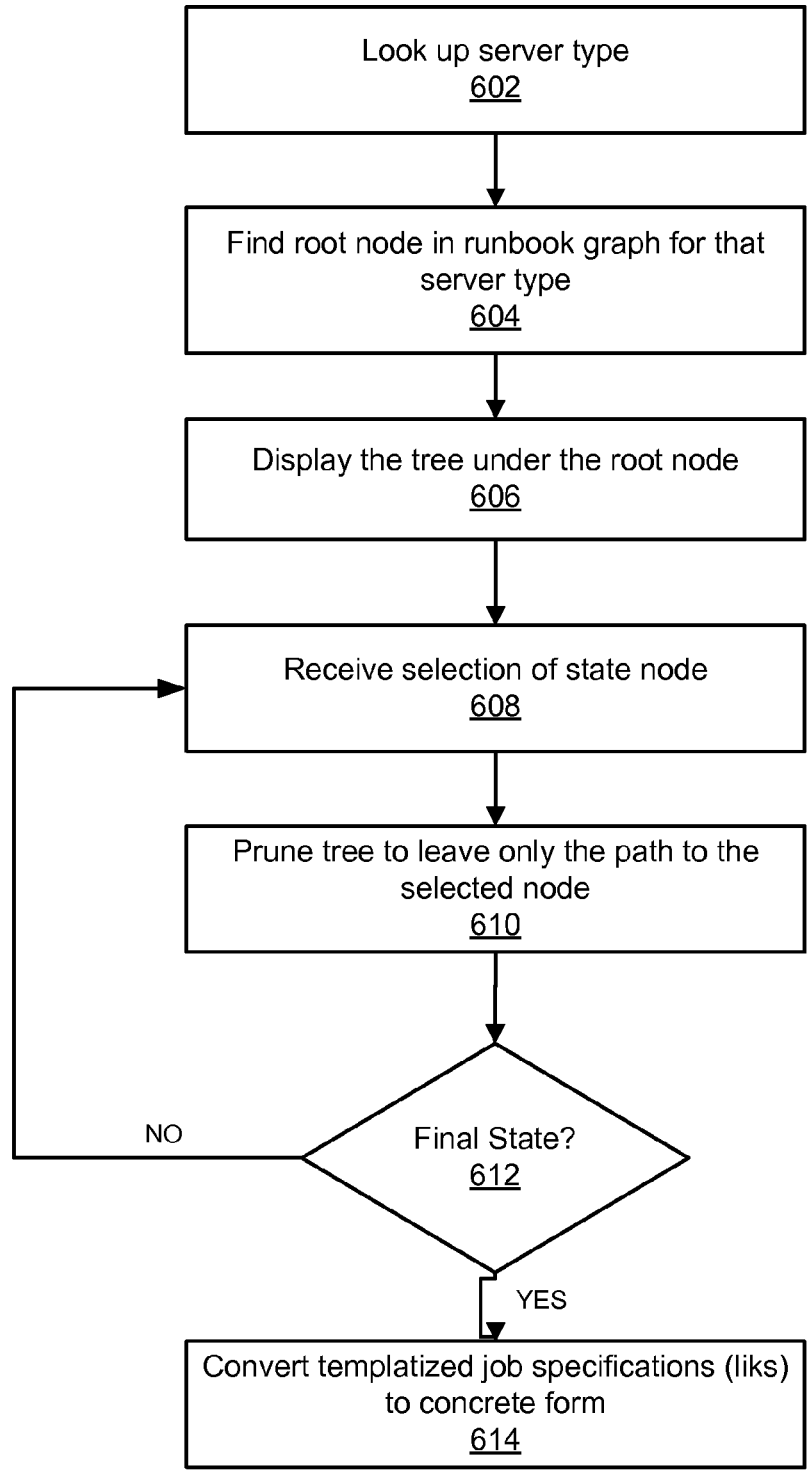
FIG. 6 is a flowchart illustrating example operations associated with the use of the screenshot of FIG. 5 in provisioning a new server.

As referenced, FIG. 6 illustrates a flowchart 600 providing more detailed example operations associated with utilization of the runbook graph 300 of FIG. 3 in conjunction with provisioning a new server within the data center 106. In other words, the flowchart 600 illustrates example operations of the recommendation manager 116 of the runbook manager 102 of FIG. 1.

For example, in the examples referenced above in which the job history monitor 108 is associated with a server automation tool utilized to automate certain operations of the servers 104, it may occur that the user of the data center 106 identifies the new server to be provisioned in the context of the automation tool. Then, based on an associated server configuration, an initial state (i.e., root node and the runbook graph 300) may be identified. More generally, as illustrated in FIG. 6, a server type corresponding to the server in question may be looked up or otherwise provided (602), and the corresponding root node and a corresponding runbook graph for that server type may be found (604).

Subsequently, the tree graph under the identified root node may be displayed (606). Of course, in other example implementations, the same information may be provided in other formats, e.g., in list form. In the example, it is assumed that the root node corresponds to the root node 306 of FIG. 3, so that, as illustrated in the screenshot 500 of FIG. 5, subsequent links and state nodes of the root node 306 are displayed. As described above, the various links may be associated with templatized information about respective provisioning jobs. Therefore, the user may be allowed to click on a specific link, hover a mouse pointer over a specific link, or otherwise select a specific link, in order to view such templatized details, and ultimately to select or modify the templatized details in a desired manner. Although not specifically illustrated in the example of FIG. 5, a frequency count or other frequency indicator may be provided in conjunction with each link and/or each state node.

Then, the user may select one of the displayed alternatives, so that the recommendation manager 116 receives the user selection (608). In response, the recommendation manager 116 may prune the tree graph to leave only the relevant path between the root node and the selected node (610). If the selected state is a final state (612), then the templatized job specifications associated with the various intervening links may be converted to a concrete, parameterized form (614). Such a conversion may be executed in a partially or completely automated manner, e.g., using provided default values.

Otherwise, if the selected state is not a final state (612), then subsequent selections of state nodes may be received (608), in conjunction with subsequent tree pruning operations (610), until a final state is reached. Again, a final state determination may be made in a partially or completely automated fashion, and/or may utilize requested user input to determine whether a desired state has been reached.

In the context of such operations for identifying and selecting a final, desired state, it may be appreciated that the types of labeling of state nodes of the runbook graph 300 referenced above may be useful to the user in identifying a final state. For example, such user-provided labels may be easily readable and identifiable by the user, and/or may facilitate the above-referenced searching operations with respect to the screenshot 500 of FIG. 5. However, if such user-provided labels are not available, or are not sufficiently helpful, than the user may proceed in the type of iterative path selection process just described with respect to FIG. 6, until a desired final state is reached.

Figure 7:
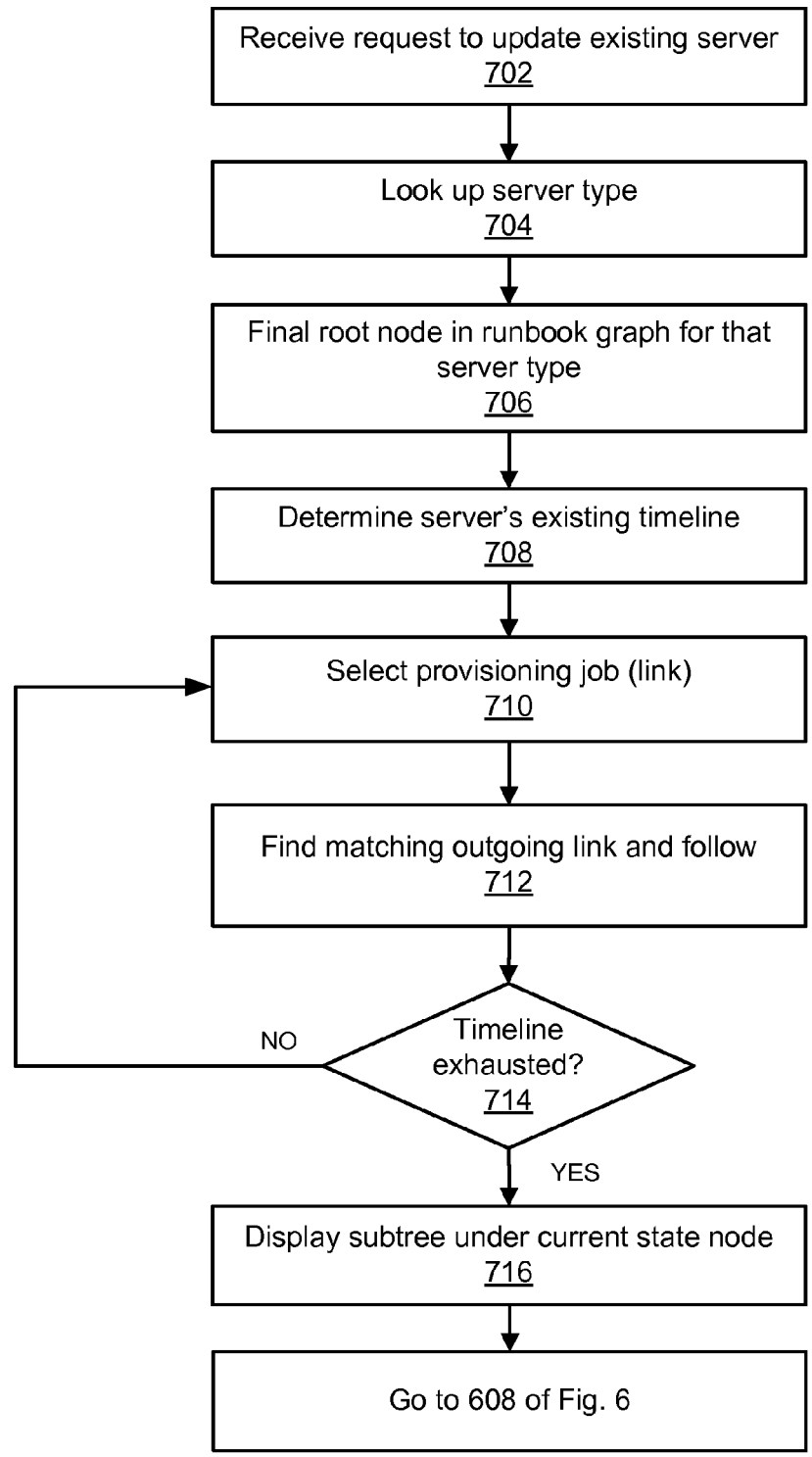
FIG. 7 is a flowchart illustrating example operations for updating an existing server.

FIG. 7 is a flowchart 700 illustrating more detailed example operations with respect to updating an existing provisioned server of the servers 104 within the data center 106, using the runbook graph 300 of FIG. 3. In the example of FIG. 7, it is assumed that the recommendation manager 116 receives a request to update an existing server (702). For example, the user may request display of an entire forest graph of the runbook graph 300, and may select a particular state node therefrom.

Based on the request, the recommendation manager 116 may identify a corresponding server type (704). For example, in a simplified example, it may occur that the recommendation manager 116 provides the screenshot 500 of FIG. 5, and the user selects the root node 306, which would immediately identify the server type in question. In other examples, the user may select a subsequent state from within the runbook graph, or upon the recommendation manager 116 would traverse the runbook graph in reverse in order to arrive at a corresponding root node. In any case, the recommendation manager 116 identifies the corresponding root node for the relevant server type within the runbook graph (706).

The recommendation manager 116 may then identify an existing provisioning job timeline for the server in question (708). It may occur that a server's job provisioning timeline includes a plurality of provisioning jobs, i.e., corresponding links, so that the recommendation manager 116 may thus select a first link therefrom (710). The recommendation manager 116 may then find each matching, outgoing link within the runbook graph, and may follow the link to a subsequent state (712). If the timeline is not exhausted (714), then the recommendation manager 116 may select a subsequent provisioning job (710), and identify a matching outgoing link (712), until the timeline is exhausted (714).

In this way, the recommendation manager 116 effectively identifies the path within the runbook graph 300 that has been followed thus far for the server in question. Consequently, the user is provided with a current state of the server in terms of the relevant tree graph of the runbook graph, so that the recommendation manager 116 may thus display a sub-tree graph which exists under the current state node corresponding to the current state of the server in question (716).

At this point, the user is enabled to make further selections of state nodes from within remaining portions of the displayed sub-tree, just as described above with respect to FIG. 6, so as to thereby identify a final-desired state for the server in question. In other words, further operations of the flowchart 700 may proceed to execution of operation 608 (and subsequent operations) of the flowchart 600 (718).

Also, as referenced above with respect to the provisioning tool 118, a creation of a provisioning plan such as may result from operations of the flowcharts 600 and/or 700 of FIGS. 6 and/or 7, respectively, may enable automatic execution of the identified provisioning jobs. In other words, once a provisioning plan is created using the runbook graph generator 114 and the recommendation manager 116, execution of that provisioning plan may be partially or completely automated.

For example, as in the examples referenced above with respect to FIG. 1, in which the job history monitor 108 represents or is associated with a server automation tool, such job execution may occur in a straightforward manner by creating execution tasks (e.g., for deploying files or applications), or schedules for periodically running tasks (e.g., compliance checks or patch analysis jobs), with respect to the specific server being configured. By reducing or eliminating a need for the user at the data center 106 to manually create or schedule jobs, the runbook manager 102 thus minimizes or eliminates the possibility of human error or omissions associated with the execution of such provisioning jobs.

FIG. 8 illustrates example job history data that may be utilized by the history analyzer 112. In the example of FIG. 8, it is assumed that the job history repository 110 includes a type of job history data referenced above, and that the history analyzer 112 extracts the job history of FIG. 8, e.g., using suitable complex structured query language (SQL) queries.

Figure 9:
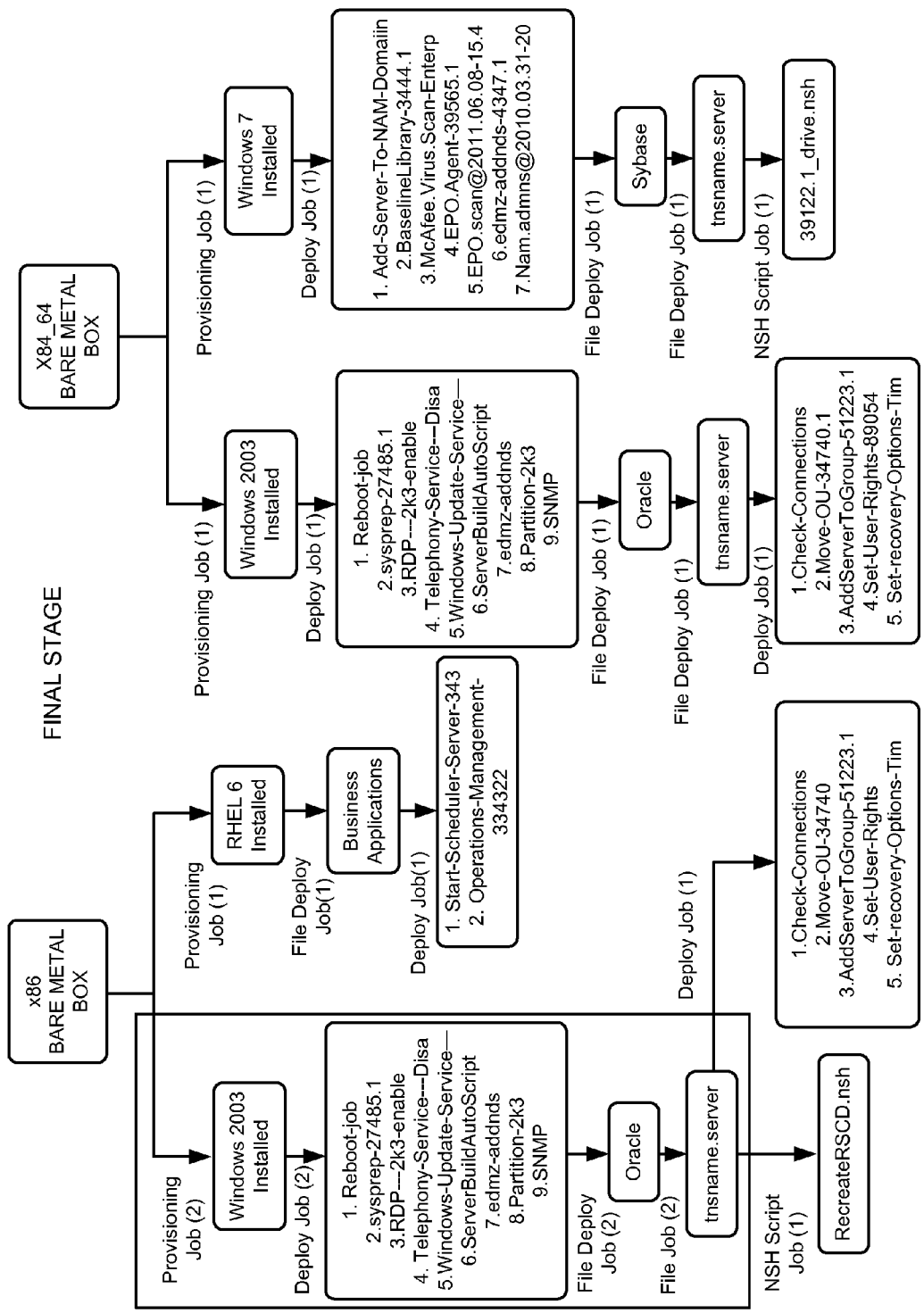
FIG. 9 is a block diagram of a runbook graph generated using the sample data of FIG. 8.

FIG. 9 illustrates an example runbook graph that may be generated using the sample job history data of FIG. 8 (and related data). The example of FIG. 9 mirrors the previously-described example of FIG. 3, and is therefore not described here in detail. Nonetheless, it may be appreciated from the example of FIG. 9 that the runbook graph illustrated therein includes at least the first tree graph associated with the x86 server type having a 32-bit architecture, as well as an x86 server type having a 64-bit architecture.

Implementations of the various techniques described herein may be implemented in digital electronic circuitry, or in computer hardware, firmware, software, or in combinations of them. Implementations may implemented as a computer program product, i.e., a computer program tangibly embodied in a non-transitory information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A system including instructions stored on a non-transitory computer readable storage medium and executable by at least one semiconductor processor, the system comprising:
   a history analyzer configured to cause the at least one semiconductor processor to analyze a job history for a plurality of provisioning jobs performed to provision a plurality of servers of a plurality of server types, each of the plurality of servers being provisioned using a corresponding sequence of provisioning jobs of the plurality of provisioning jobs, to thereby obtain an analyzed job history including timelines of the sequences of provisioning jobs executed against the plurality of servers;
   a runbook manager configured to cause the at least one semiconductor processor to create a runbook in which the timelines of provisioning jobs are organized by server type of the plurality of server types;
   a recommendation manager configured to cause the at least one semiconductor processor to receive a provisioning request for provisioning a new server of a requested server type, and identify a corresponding timeline of the timelines, based on the requested server type; and
   a provisioning tool configured to provision the server including executing provisioning jobs of the corresponding timeline,
   wherein the runbook manager comprises a runbook graph generator configured to generate the runbook, including generating a runbook graph in which pairs of server states are linked by corresponding provisioning jobs that advance a corresponding server from the first state of the pair of server states to the second state of the pair of server states.

2. The system of claim 1, wherein the history analyzer is configured to receive the job history from a server automation tool managing operations of the plurality of servers.

3. The system of claim 1, wherein the runbook graph includes a frequency count for each link, representing a number of times a corresponding provisioning job has been executed for servers of the same type within the job history.

4. The system of claim 1, wherein the runbook graph includes a forest graph of nodes, each representing a server state, and links, each representing a provisioning job, and wherein the forest graph includes a plurality of tree graphs defined by corresponding root nodes, where each root node corresponds to a server type.

5. The system of claim 4, wherein the recommendation manager is further configured to select a root node corresponding to a type of the new server, and selecting provisioning jobs from among subsequent links and nodes of the selected root node.

6. The system of claim 4, wherein the recommendation manager is further configured to update a currently-provisioned server including selecting a current state node corresponding to the currently-provisioned server, and selecting provisioning jobs from among subsequent links and nodes of the current state node.

7. The system of claim 4, wherein the recommendation manager is further configured to display the runbook graph by way of a graphical user interface, and to receive a selection of a desired state of a server to be provisioned or updated including receiving a selection of a corresponding node of the displayed runbook graph.

8. The system of claim 1, wherein the runbook manager is further configured to update the runbook, based on updates to the job history.

9. A method comprising:
   analyzing a job history for a plurality of provisioning jobs performed to provision a plurality of servers of a plurality of server types, each of the plurality of servers being provisioned using a corresponding sequence of provisioning jobs of the plurality of provisioning jobs, to thereby obtain an analyzed job history including timelines of the sequences of provisioning jobs executed against the plurality of servers;
   creating a runbook in which the timelines of provisioning jobs are organized by server type of the plurality of server types, including generating a runbook graph in which pairs of server states are linked by corresponding provisioning jobs that advance a corresponding server from the first state of the pair of server states to the second state of the pair of server states;
   receiving a provisioning request for provisioning a new server of a requested server type, and identify a corresponding timeline of the timelines, based on the requested server type; and
   provisioning the server including executing provisioning jobs of the corresponding timeline.

10. The method of claim 9, wherein the runbook graph includes a forest graph of nodes, each representing a server state, and links, each representing a provisioning job, and wherein the forest graph includes a plurality of tree graphs defined by corresponding root nodes, where each root node corresponds to a server type.

11. A computer program product including instructions recorded on a non-transitory computer readable storage medium and configured to cause at least one processor to:
- analyze a job history for a plurality of provisioning jobs performed to provision a plurality of servers of a plurality of server types, each of the plurality of servers being provisioned using a corresponding sequence of provisioning jobs of the plurality of provisioning jobs, to thereby obtain an analyzed job history including timelines of the sequences of provisioning jobs executed against the plurality of servers;
- create a runbook in which the timelines of provisioning jobs are organized by server type of the plurality of server types, including generating a runbook graph in which pairs of server states are linked by corresponding provisioning jobs that advance a corresponding server from the first state of the pair of server states to the second state of the pair of server states;
- receive a provisioning request for provisioning a new server of a requested server type, and identify a corresponding timeline of the timelines, based on the requested server type; and
- provision the server including executing provisioning jobs of the corresponding timeline.

12. The computer program product of claim 11, wherein the runbook graph includes a forest graph of nodes, each representing a server state, and links, each representing a provisioning job, and wherein the forest graph includes a plurality of tree graphs defined by corresponding root nodes, where each root node corresponds to a server type.

13. The computer program product of claim 12, wherein the instructions, when executed, are further configured to cause the at least one processor to select a root node corresponding to a type of the new server, and select provisioning jobs from among subsequent links and nodes of the selected root node.

14. The computer program product of claim 11, wherein the instructions, when executed, are further configured to cause the at least one processor to display the runbook graph by way of a graphical user interface, and to receive a selection of a desired state of a server to be provisioned or updated including receiving a selection of a corresponding node of the displayed runbook graph.

* * * * *